United States Patent
Brandt et al.

(10) Patent No.: US 12,509,611 B2
(45) Date of Patent: Dec. 30, 2025

(54) ANAEROBICALLY CURABLE COMPOSITIONS CONTAINING ALPHA-METHYLENE-LACTONES

(71) Applicant: Henkel AG & Co. KGaA, Düsseldorf (DE)

(72) Inventors: Adrian Brandt, Essen (DE); Horst Beck, Neuss (DE); Andreas Taden, Düsseldorf (DE); Ralph Nemitz, Juechen (DE); Alexander Kux, Monheim (DE); Nigel Sweeney, Dublin (IE); David Birkett, Kildare (IE); Brendan Kneafsey, Dublin (IE); James A. Houlihan, Dublin (IE); Michael Doherty, Kildare (IE)

(73) Assignee: Henkel AG & Co. KGaA, Duesseldorf (DE)

( * ) Notice: Subject to any disclaimer, the term of this patent is extended or adjusted under 35 U.S.C. 154(b) by 952 days.

(21) Appl. No.: 17/152,986

(22) Filed: Jan. 20, 2021

(65) Prior Publication Data

US 2021/0139623 A1    May 13, 2021

Related U.S. Application Data

(63) Continuation of application No. PCT/EP2019/069974, filed on Jul. 24, 2019.

(30) Foreign Application Priority Data

Jul. 31, 2018 (GB) ...................................... 1812478

(51) Int. Cl.
*C09J 4/00* (2006.01)
*C08F 220/28* (2006.01)
(Continued)

(52) U.S. Cl.
CPC ............. *C09J 4/00* (2013.01); *C08F 220/286* (2020.02); *C08F 222/102* (2020.02); *C09J 4/06* (2013.01); *C09J 133/14* (2013.01)

(58) Field of Classification Search
CPC .... C09J 4/00; C09J 4/06; C09J 133/14; C08F 220/286; C08F 222/102
See application file for complete search history.

(56) References Cited

U.S. PATENT DOCUMENTS

| | | | |
|---|---|---|---|
| 3,218,305 | A | 11/1965 | Krieble |
| 4,180,640 | A | 12/1979 | Doherty et al. |

(Continued)

FOREIGN PATENT DOCUMENTS

| | | | | |
|---|---|---|---|---|
| CN | 103596995 | | 2/2014 | |
| GB | 2546320 | A * | 7/2017 | ............... C08K 3/10 |

(Continued)

OTHER PUBLICATIONS

Miyai JP 2010/179640 A (transl. JPO) (Year: 2010).*
(Continued)

*Primary Examiner* — Arrie L Reuther
(74) *Attorney, Agent, or Firm* — Steven C. Bauman

(57) ABSTRACT

The present invention relates to anaerobically curable compositions made from renewable materials. In particular, an alpha-methylene-lactone is used with a (meth)acrylate component and a cure system to form an anaerobically curable composition.

3 Claims, 1 Drawing Sheet

Torque Strengths on black oxide M10 nuts and bolts.

(51) Int. Cl.
*C08F 222/10* (2006.01)
*C09J 4/06* (2006.01)
*C09J 133/14* (2006.01)

(56) References Cited

U.S. PATENT DOCUMENTS

| | | |
|---|---|---|
| 4,287,330 A | 9/1981 | Rich |
| 4,321,349 A | 3/1982 | Rich |
| 6,531,616 B2 | 3/2003 | Puts et al. |
| 6,891,053 B2 | 5/2005 | Chasar et al. |
| 6,897,277 B1 | 5/2005 | Brantl et al. |
| 7,728,092 B1 | 6/2010 | Jacobine et al. |
| 8,575,378 B2 | 11/2013 | Garrett et al. |
| 8,757,294 B2 | 6/2014 | Johnson et al. |
| 2006/0100447 A1 | 5/2006 | Manzer et al. |
| 2012/0118832 A1 | 5/2012 | Yontz et al. |
| 2014/0066581 A1 | 3/2014 | Hilker et al. |
| 2014/0073742 A1 | 3/2014 | Jansen et al. |
| 2014/0087111 A1 | 3/2014 | Hilker et al. |

FOREIGN PATENT DOCUMENTS

| | | |
|---|---|---|
| GB | 2548918 | 7/2020 |
| JP | 2009108211 | 5/2009 |
| JP | 2010179640 | 8/2010 |
| WO | 9901484 | 1/1999 |
| WO | 0257362 | 7/2002 |

OTHER PUBLICATIONS

PCT International Search Report issued in connection with International Patent Application No. PCT/EP2019/069974—Mailing date: Nov. 11, 2019.

* cited by examiner

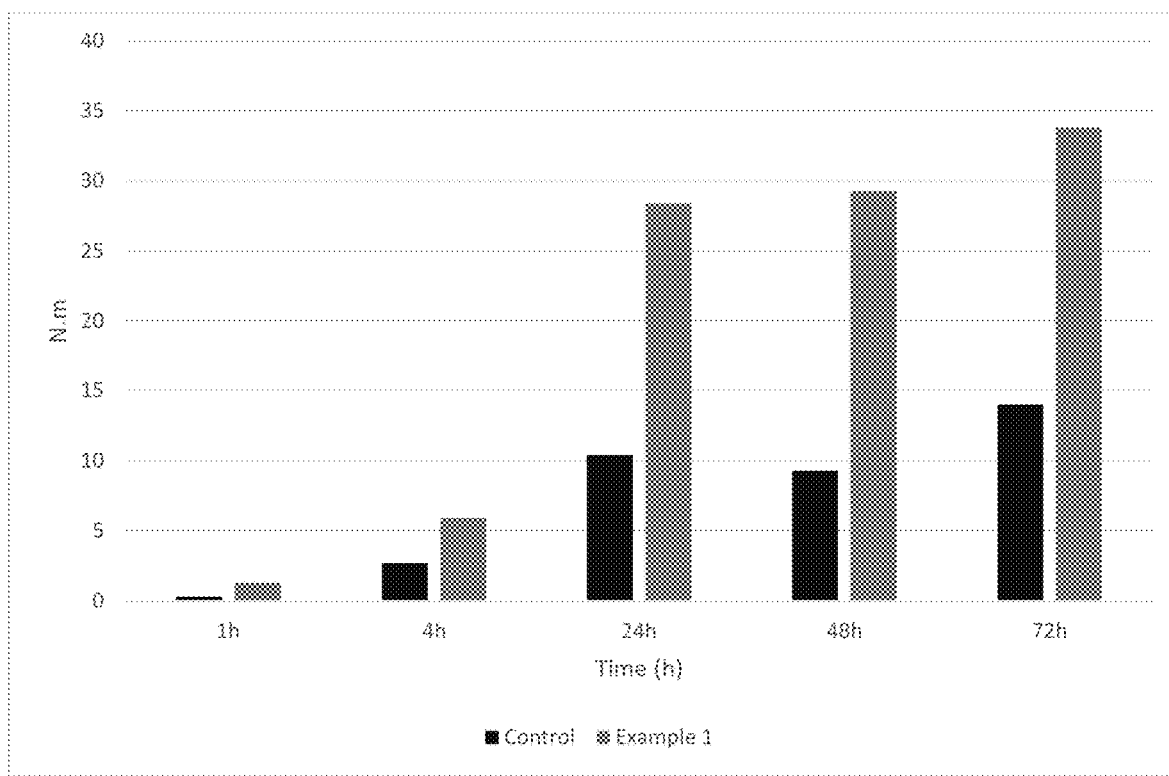

ANAEROBICALLY CURABLE COMPOSITIONS CONTAINING ALPHA-METHYLENE-LACTONES

BACKGROUND

Field

The invention relates generally to alpha-methylene-lactone containing anaerobically curable compositions, methods of making these anaerobically curable compositions, and processes of preparing a reaction product of these anaerobically curable compositions.

Brief Description of Related Technology

Anaerobic adhesive compositions are well known and generally include a (meth)acrylate component; and an anaerobic cure system. For example, a fairly recent U.S. patent, U.S. Pat. No. 7,728,092, discloses an anaerobically curable composition comprising a specified (meth)acrylate component and an anaerobic cure system, to which is added a combination of copper salt and a sequestering agent.

Presently, there is an emphasis on identifying renewable sources for raw materials, particularly for replacing petroleum-based products. A number of companies have focused on modifying plant oils to include functional groups which are useful for further reactions and producing polymer materials. For example, U.S. Pat. No. 6,891,053 discloses a method of making oleochemical oil-based polyols by mixing an epoxidized oleochemical, such as a vegetable or animal fat, and an alcohol using an activated or acid leached-clay to form the oleo-chemical oil-based polyol. U.S. Pat. Nos. 8,757,294 and 8,575,378 disclose other methods of making modified plant-based polyols by using a plant oil which includes at least one C=C group and reacting that group with a nucleophilic functional group and an active hydrogen group. The result is specific plant oils which have hydroxyl functionalization useful for further reaction, such as the reaction with an isocyanate compound to form a polyurethane.

Lactones are known. Some are generated as by-products of renewable sources. One such lactone derived from a renewable source is gamma-valerolactone. Several methods of making lactones, such as gamma-valerolactone, have been reported. For example, alpha-methylene-lactone can be made by gas phase synthesis with formalin and basic catalysts at 200-400° C. according to U.S. Patent Application Publication No. 2006/0084818A1, which reports the following synthetic scheme:

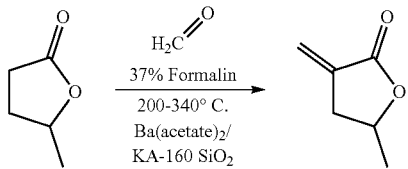

U.S. Patent Application Publication No. 2006/0100447A1 discloses yet another synthesis method, specifically for the preparation of gamma-valerolactone through conversion of levulinic acid.

Lactones like these have been used in a variety of different ways. For example, lactones have been used as reactive diluents (see e.g. U.S. Patent Application Publication No. 2014/0073742), ionic polymers (see e.g. U.S. Patent Application Publication No. 2012/0118832), decorative elements (see e.g. International Patent Publication No. WO 200257362), radical curing agents (see e.g. U.S. Patent Application Publication No. 2014/0066581), and in display assemblies (see e.g. Japanese Patent Document No. JP 2010179640).

Despite the state of the technology, lactones derived from renewable sources have not been used or disclosed as a component of anaerobically curable compositions, particularly for use as adhesives, thread sealants, thread lockers, and retainers. There is a long-standing desire to introduce into anaerobically curable compositions constituents based on or derived from renewable sources, and when so introduced the resulting compositions show a rapid build up of strength but have retention of stability and performance.

SUMMARY

That desire has been satisfied here.

In one aspect of the invention there is provided an anaerobic curable composition, comprising: a (meth)acrylate component; an alpha-methylene-lactone; and an anaerobic cure system.

In another aspect of the invention there is provided a method for forming an anaerobic curable composition made from a renewable source, comprising: providing a (meth)acrylate component; providing an alpha-methylene-lactone; providing an anaerobic cure system; and mixing together the (meth)acrylate component, alpha-methylene-lactone, and anaerobic cure system for a time sufficient to form the anaerobic curable composition.

In yet another aspect of the invention there is provided a method of preparing a reaction product from the anaerobic adhesive composition of the present invention, the steps of which include applying the composition to a desired substrate surface and exposing the composition to an anaerobic environment for a time sufficient to cure the composition.

BRIEF DESCRIPTION OF THE DRAWING

FIG. 1 shows a bar graph of the torque strength over time of a control and a composition of the invention on black oxide M10 steel nuts and mild steel bolts.

DETAILED DESCRIPTION

Described herein are anaerobically curable compositions useful for a variety of applications, such as thread lockers, thread sealants, adhesives and retaining compounds. The anaerobically curable compositions of the present invention can show enhanced torque strength and stability over time.

The present invention uses alpha-methylene-lactones in anaerobically curable compositions. Specifically, the anaerobically curable compositions of the present invention comprise a (meth)acrylate component, an alpha-methylene-lactone, and an anaerobic cure system.

The specific alpha-methylene-lactones useful in the inventive composition are not particularly limited. For example, useful alpha-methylene-lactones can be produced through a variety of synthesis routes, such as any of the methods of the state of the art disclosed above. In one such method, alpha-methylene-lactones for use in the present invention can be produced using a two-step synthesis (described in U.S. Pat. No. 6,531,616) and shown below:

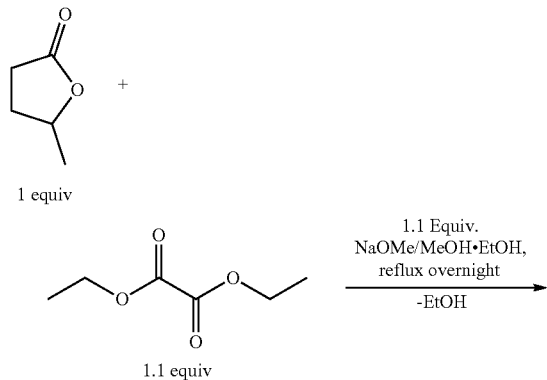

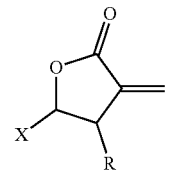

wherein n is 1-3, X is OH, H, CH$_3$, C$_2$-C$_{10}$ linear or branched alkyl, or aryl, and R is OH, H, CH$_3$, C$_2$-C$_{10}$ linear or branched alkyl, or aryl.

Among possible alpha-methylene-lactones, alpha-methylene-gamma valerolactone is useful. A commercial source of this valerolactone is TCI Europe NV, Zwijndrecht, Belgium. Alpha-methylene-gamma valerolactone has the following structure:

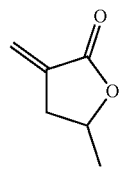

Alpha-methylene-gamma valerolactone

Further among alpha-methylene-lactones, alpha-methylene-butyrolactone is also useful for the present invention. Alpha-methylene-butyrolactone has the following generic structure:

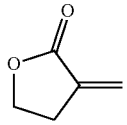

Even further, among alpha-methylene-lactones, alpha-methylene-delta-valerolactone, alpha-methylene-caprolactone, alpha-methylene-gamma-R$^1$ butyrolactone (where R$^1$ is as defined for R and can be an optionally substituted alkyl or optionally substituted aryl) can be useful in the present application. Of course, combinations of the so-described alpha-methylene lactones may also be used.

Alpha-methylene-lactones can be included in the composition in an amount of about 5 to about 90 percent by weight, such as about 5 to about 50 percent by weight, based on the total weight of the anaerobically curable composition.

The (meth)acrylate component in the present invention can include (meth)acrylate monomers that can be chosen from a wide variety of materials, such as those represented by H$_2$C=CGCO$_2$R$^1$, where G may be hydrogen, halogen or alkyl groups having from 1 to about 4 carbon atoms, and R$^1$ here may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, carbonate, amine, amide, sulfur, sulfonate, sulfone and the like.

Additional (meth)acrylate monomers suitable for use herein include polyfunctional (meth)acrylate monomers, such as, but not limited to, di- or tri-functional (meth)acrylates like polyethylene glycol di(meth)acrylates, tetra-

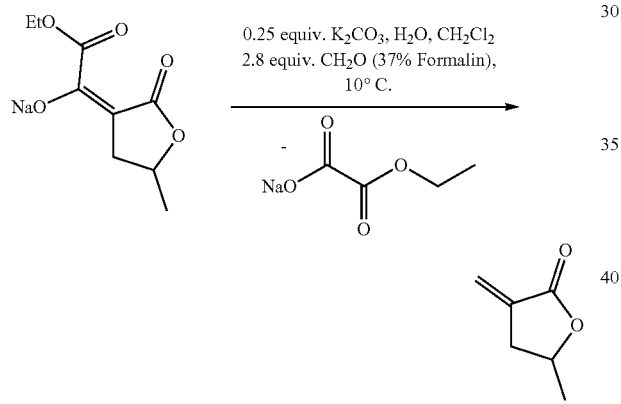

Useful alpha-methylene-lactones can include 6 or 7 membered rings too, in addition to the 5 membered alpha-methylene-lactones. Thus, the alpha methylene lactones can have the following general structure:

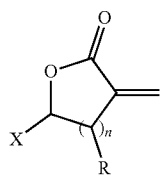

wherein n is 1-3, X is OH, H, CH$_3$, C$_2$-C$_{10}$ linear or branched alkyl, or aryl, and R is OH, H, CH$_3$, C$_2$-C$_{10}$ linear or branched alkyl, or aryl.

Specifically, alpha-methylene-lactones can include 5 membered rings, such as the alpha-methylene-lactones having the following generic structure:

hydrofuran (meth)acrylates and di(meth)acrylates, hydroxypropyl (meth)acrylate ("HPMA"), hexanediol di(meth) acrylate, trimethylol propane tri(meth)acrylate ("TMPTMA"), diethylene glycol dimethacrylate, triethylene glycol dimethacrylate ("TRIEGMA"), tetraethylene glycol dimethacrylate, dipropylene glycol dimethacrylate, di-(pentamethylene glycol) dimethacrylate, tetraethylene diglycol diacrylate, diglycerol tetramethacrylate, tetramethylene dimethacrylate, ethylene dimethacrylate, neopentyl glycol diacrylate, trimethylol propane triacrylate and bisphenol-A mono and di(meth)acrylates, such as ethoxylated bisphenol-A (meth)acryalte ("EBIPMA"), and bisphenol-F mono and di(meth)acrylates, such as ethoxylated bisphenol-F (meth)acrylate.

Still other (meth)acrylate monomers that may be used herein include silicone (meth)acrylate moieties ("SiMA"), such as those taught by and claimed in U.S. Pat. No. 5,605,999 (Chu), the disclosure of which is hereby expressly incorporated herein by reference.

Still further, among the useful (meth)acrylate monomers useful in the present composition are (meth)acrylate-containing hydroxyl compounds. More specifically, without limitation, 2-hydroxyethyl methacrylate, 2-hydroxyethyl acrylate, 3-hydroxypropyl methacrylate, 3-hydroxypropyl acrylate, 2-hydroxypropyl acrylate, 4-hydroxybutyl acrylate, 3-hydroxybutyl acrylate, 2-hydroxybutyl acrylate, 3-(acryloyloxy)-2-hydroxypropyl methacrylate, 2-isocyanatoethyl methacrylate, 2-isocyanatoethyl acrylate, and poly(propylene glycol) (meth)acrylate are useful.

Even further, among the useful (meth)acrylate-containing compounds are (meth)acrylate-containing isocyanates. More specifically, without limitation, 2-isocyanatoethyl acrylate, 2-isocyanatoethyl methacrylate, 3-isocyanatopropyl (meth)acrylate, 2-isocyanatopropyl (meth)acrylate, 4-isocyanatobutyl (meth)acrylate, 3-isocyanatobutyl (meth) acrylate, and 2-isocyanatobutyl (meth)acrylate are useful.

Of course, combinations of these (meth)acrylate monomers may also be used.

The (meth)acrylate component can be present in the anaerobically curable composition in an among in the range of about 5 to about 90 percent by weight, more particularly about 20 to about 50 percent by weight, based on the total weight of the anaerobically curable composition.

Desirably, anaerobic cure systems can be included in the anaerobically curable composition to induce and accelerate anaerobic cure. Examples of useful anaerobic cure systems may include: saccharin, aromatic amines such as toluidines, such as N,N,-diethyl-p-toluidine ("DE-p-T") and N,N-dimethyl-o-toluidine ("DM-o-T"), acetyl phenylhydrazine ("APH"), maleic acid ("MA"), and phenols like hydroquinone and quinones, such as napthaquinone and anthraquinone. See e.g., U.S. Pat. No. 3,218,305 (Krieble), U.S. Pat. No. 4,180,640 (Melody), U.S. Pat. No. 4,287,330 (Rich) and U.S. Pat. No. 4,321,349 (Rich). In addition, phenyl glycines and derivatives thereof (such as N-phenyl glycine and N-methyl-N-phenyl glycine), ethyl-4-(dimethylamino)-benzoate ("EMBO"), and 3-methyl-1-phenyl-2-pyrazolin-5-one, and combinations thereof may be included as well.

The anaerobic cure system should be present in the anaerobically curable composition in an amount up to about 5 percent by weight, such as about 0.2 to about 2 percent by weight, based on the total weight of the anaerobically curable composition.

In the context of anaerobic curable compositions, chelating agents such as the tetra-sodium salt of ethylenediamine tetra acetic acid ("EDTA") to trap trace amount of metal contaminants may be used. When used, chelators may ordinarily be present be present in the compositions from an amount of about 0.001 percent by weight to about 0.1 percent by weight based on the total weight of the anaerobically curable composition.

Further, additional components can be included in the anaerobically curable compositions to alter the physical properties of either the curable compositions or the reaction products thereof.

Non-reactive additives may also be added to the inventive composition such as silica, fillers, dyes and lubricants or plasticizers. These non-reactive additives are known in the art and may advantageously be incorporated where functionally desirable, provided only that they do not interfere with the functioning of the composition for its intended purpose. These non-reactive additives can be included in the anaerobically curable composition in an amount of up to about 50 percent by weight, such as from about 2.5 to about 30 percent by weight based on the total weight of the anaerobically curable composition.

The inventive compositions may also include metal catalysts, such as iron and copper, if desired.

Accelerators may also be included in the composition. Such accelerators include a variety of secondary and tertiary organic amines as well as sulfimides (e.g., benzoic sulfimide, or saccharin) which are also known in the art.

A number of well-known initiators of free radical polymerization can be incorporated into the inventive compositions including, without limitation, hydroperoxides, such as CHP, para-methane hydroperoxide, t-butyl hydroperoxide ("TBH") and t-butyl perbenzoate. Other peroxides include benzoyl peroxide, dibenzoyl peroxide, 1,3-bis(t-butylperoxyisopropyl)benzene, diacetyl peroxide, butyl 4,4-bis(t-butylperoxy)valerate, p-chlorobenzoyl peroxide, cumene hydroperoxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane and combinations thereof.

Further, one or more of maleimide components, thermal resistance-conferring coreactants, diluent components reactive at elevated temperature conditions, mono- or polyhydroxyalkanes, polymeric plasticizers, and chelators (see International Patent Application No. PCT/US98/13704, the disclosure of which is hereby expressly incorporated herein by reference) may be included to modify the physical property and/or cure profile of the formulation and/or the strength or temperature resistance of the cured adhesive.

In addition, this invention provides a method of preparing an anaerobic curable composition, a step of which includes mixing together a (meth)acrylate component, an alpha-methylene-lactone, and an anaerobic cure system. The compositions of the present invention may be prepared using conventional methods which are well known to those persons of skill in the art. For instance, the components of the inventive compositions may be mixed together in any convenient order consistent with the roles and functions the components are to perform in the compositions. Conventional mixing techniques using known apparatus may be employed.

The invention also provides a process for preparing a reaction product from the anaerobically curable composition of the present invention, the steps of which include applying the composition to a desired substrate surface, mating the composition-applied substrate with another substrate to form an assembly, and exposing the assembly to an anaerobic environment for a time sufficient to cure the composition.

The compositions of this invention may be applied to a variety of substrates to perform with the desired benefits and advantages described herein. For instance, appropriate substrates may be constructed from steel, brass, copper, aluminum, zinc, glass and other metals and alloys, ceramics and thermosets. The compositions of this invention demonstrate particularly good bond strength on steel, glass and aluminum. An appropriate primer may be applied to a surface of the chosen substrate to enhance cure rate.

The present invention will be illustrated by the following non-limiting examples.

EXAMPLES

Example 1

Two formulations were prepared for evaluation. One formulation—the Control—used 30 percent by weight more of a (meth)acrylate component, PEGDMA, than the Example 1. Instead of the full complement of PEGDMA, Example 1 replaced 30 percent by weight with the same amount of alpha-methylene-gamma-valerolactone. Table 1 below shows all of the constituents of the Control and Example 1 and their relative amounts.

TABLE 1

| Constituents | Control (wt. %) | Example 1 (wt. %) |
| --- | --- | --- |
| Polyethylene glycol DiMA [1] | 62.73 | 32.73 |
| Polyethylene glycol 200 monooleate | 26.17 | 26.17 |
| α-methylene-γ-valerolactone | 0.00 | 30.00 |
| Stabilizer Solution 1 [2] | 0.80 | 0.80 |
| Stabilizer Solution 2 [3] | 1.50 | 1.50 |
| Saccharin | 3.78 | 3.78 |
| Filler mix [4] | 0.43 | 0.43 |
| Dye | 0.19 | 0.19 |
| N,N-Diethyl-p-toluidine | 0.80 | 0.80 |
| Cumene hydroperoxide | 1.80 | 1.80 |
| Hydrophilic Fumed Silica [6] | 1.80 | 1.80 |
|  | 100.00 | 100.00 |

[1] Polyethylene glycol dimethacrylate
[2] 1,4-Naphtoquinone 5 wt. % in Polyethylene glycol dimethacrylate 95 wt. %
[3] Tetrasodium ethylenediaminetetraacetic acid 3.5 wt. %, water 23 wt. %, propylene glycol 73.5 wt. %
[4] Filler mix: Titanium dioxide 70 wt. %, calcium carbonate 30%
[5] Dye solution: Solvent red 24 10 wt. %, 90 wt. % polyethylene glycol
[6] AEROSIL 200

The two formulations were prepared by mixing together the constituents for an appropriate time to dissolve or suspend the constituents to make a substantially homogeneous composition.

Table 2 records the demonstrated effect that the addition of alpha-methylene-gamma-valerolactone has on the build of break and prevail strength on black oxide M10 nut and mild steel bolt assemblies over time in the Control as compared to the Example 1. Tests were conducted according to ASTM D5649 "Torque Strength of Adhesives Used on Threaded Fasteners". Nuts and bolts were degreased prior to assembly with the formulations. The break strength is the initial torque required to break the bond when measured at the first movement between the nut and the bolt when unscrewing the assembly. The prevail is the sum of the average of torque measurements at 90, 180, 270 and 360° rotation around the bolt, after the initial breaking of the bond.

TABLE 2

| Time | Control | | Example 1 | |
| --- | --- | --- | --- | --- |
| after assembly (h) | Break Strength (N/m) | Prevail (N/m) | Break Strength (N/m) | Prevail (N/m) |
| 1 | 0.3 | 0 | 1.3 | 0.3 |
| 4 | 2.7 | 0.4 | 5.9 | 1 |
| 24 | 10.4 | 1.3 | 28.4 | 4.3 |
| 48 | 9.3 | 1.4 | 29.3 | 3.7 |
| 72 | 14 | 2.2 | 33.8 | 4.2 |

The results recorded in Table 2 are also shown in FIG. 1. It is evident from FIG. 1 that at each recorded time interval Example 1 (with the addition of alpha-methylene-gamma-valerolactone) showed an improvement in the break strength and prevail over the Control.

Example 2

Each of the Control and Example 1 were tested for stability by heating 4 g of each sample in test tubes in a heating block maintained at 82° C. After 4 hours, neither the Control nor Example 1 showed a build-up of viscosity as measured by probing the formulations with a wooden applicator stick to determine if gelation occurred.

The test showed that the addition of alpha-methylene-gamma-valerolactone does not decrease stability, as each of the Control and Example 1 were stable for greater than four hours at 82° C.

Example 3

Each of the Control and Example 1 were tested for retaining properties. The tests were conducted according to ASTM D4562 "Standard Test Method for Shear Strength of Adhesives using Pin and Collar Specimen". Five test specimen samples for each of the Control and Example 1 were made by applying the formulations to a degreased mild steel pin and forming an assembly with a degreased mild steel collar. The assembled test specimen samples were then cured at room temperature for 24 hours. The assembled test specimen samples were tested under a compression load at a crosshead speed of 2 mm/min until the collar separated from the pin. The compression force required to separate the cured pin and collar assemblies are recorded below in Table 3.

TABLE 3

| Sample | Control | Example 1 |
| --- | --- | --- |
| 1 | 8.2 | 10.8 |
| 2 | 9.0 | 12.0 |
| 3 | 4.3 | 8.7 |
| 4 | 4.5 | 14.0 |
| 5 | 8.3 | 9.4 |
| Avg. | 6.9 | 11.0 |

What is claimed is:

1. An anaerobically curable composition comprising:
polyethylene glycol dimethacrylate;
α-methylene-γ-valerolactone; and
an anaerobic cure system comprising saccharin, 1,4-napthoquinone, and N,N-diethyl-p-toluidine, wherein:
the polyethylene glycol dimethacrylate is present in an amount of from 20 to 50 percent by weight, based on the total weight of the anaerobically curable composition,
the α-methylene-γ-valerolactone is present in an amount of from 5 to 50 percent by weight, based on the total weight of the anaerobically curable composition, and
the anaerobic cure system is present in an amount of from 0.2 to 2 percent by weight, based on the total weight of the anaerobically curable composition.

2. The composition of claim 1, wherein the α-methylene-γ-valerolactone is present in an amount of about 30 percent by weight, based on the total weight of the anaerobically curable composition.

3. The composition of claim 1, wherein the composition further comprises ethylene-diamine tetra acetic acid, present in an amount of from about 0.001 to about 0.1 percent by weight, based on the total weight of the anaerobically curable composition.

\* \* \* \* \*